United States Patent
Seo et al.

(10) Patent No.: US 8,478,349 B2
(45) Date of Patent: Jul. 2, 2013

(54) METHOD FOR EXECUTING MENU IN MOBILE TERMINAL AND MOBILE TERMINAL USING THE SAME

(75) Inventors: Kyeong-Hye Seo, Seoul (KR); Jang Jae Jung, Seoul (KR); Tae Hun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 426 days.

(21) Appl. No.: 12/796,487

(22) Filed: Jun. 8, 2010

(65) Prior Publication Data

US 2010/0311470 A1 Dec. 9, 2010

(30) Foreign Application Priority Data

Jun. 8, 2009 (KR) .................. 10-2009-0050280

(51) Int. Cl.
- *G06F 3/048* (2006.01)
- *G06F 3/033* (2006.01)
- *H04W 88/02* (2009.01)

(52) U.S. Cl.
USPC ......... 455/566; 455/556.1; 715/863; 715/841

(58) Field of Classification Search
USPC ................ 455/550.1–552.1, 556.1–557, 566; 345/156–184; 715/808, 856–858, 863–864
See application file for complete search history.

(56) References Cited

U.S. PATENT DOCUMENTS

| | | | | |
|---|---|---|---|---|
| 5,805,167 A | * | 9/1998 | van Cruyningen | 715/808 |
| 6,057,845 A | * | 5/2000 | Dupouy | 715/863 |
| 6,414,671 B1 | * | 7/2002 | Gillespie et al. | 345/157 |
| 6,664,991 B1 | * | 12/2003 | Chew et al. | 715/863 |
| 2002/0057263 A1 | * | 5/2002 | Keely et al. | 345/179 |
| 2008/0058007 A1 | | 3/2008 | Kang | |
| 2009/0005088 A1 | | 1/2009 | Hsu | |

FOREIGN PATENT DOCUMENTS

| | | |
|---|---|---|
| CN | 1533129 | 9/2004 |
| EP | 1462921 | 9/2004 |

OTHER PUBLICATIONS

In the Chinese Intellectual Property Office Application Serial No. 200910221059.2, Non-Final Office Action dated Sep. 29, 2012, 7 pages.

* cited by examiner

*Primary Examiner* — Kashif Siddiqui (74) *Attorney, Agent, or Firm* — Lee, Hong, Degerman, Kang & Waimey (57) ABSTRACT

The present disclosure is related to a method for executing a menu in a mobile terminal, the method comprising; inputting a drawing pattern on a touch screen of the mobile terminal; displaying a menu corresponding to the drawing pattern and a sub menu thereof on the touch screen by comparing a pre-stored drawing pattern table with the drawing pattern; and executing the sub menu by selecting the sub menu and a mobile terminal thereof.

16 Claims, 10 Drawing Sheets

| Drawing Pattern | MENU |
|---|---|
| 1  | phone book |
| 2  | TV |
| 3  | internet |
| 4  | schedule |
| 5  | message |
| 6  | alarm |
| 7  | tool |
| 8  | sound |
| 9  | screen |

METHOD FOR EXECUTING MENU IN MOBILE TERMINAL AND MOBILE TERMINAL USING THE SAME

This application claims the benefit of earlier filing date and right of priority to Korean Patent Application No. 10-2009-0050280, filed on Jun. 8, 2009, the contents of which is hereby incorporated by reference herein in its entirety as if fully set forth herein.

BACKGROUND OF THE DISCLOSURE

1. Field

The present disclosure relates to a method for executing a menu in a mobile terminal and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To support and increase the terminal functions, the improvement of structural parts and/or software parts of the terminal may be considered.

As a multimedia player, the terminal may execute various functions and store many folders and files.

Accordingly, various menu and input technologies have been developed. Particularly, the mobile terminal having a touch screen had been developed. Accordingly, the improved input technology is adapted in the mobile terminal.

SUMMARY

Accordingly, an object of the present disclosure is to provide a method for executing a menu in a mobile terminal, the method comprising: inputting a drawing pattern on a touch screen of the mobile terminal; displaying a menu corresponding to the drawing pattern and a sub menu thereof on the touch screen by comparing a pre-stored drawing pattern table with the drawing pattern; and executing the sub menu by selecting the sub menu.

In some exemplary embodiments, the step of displaying a menu corresponding to the drawing pattern and its sub menu on the touch screen by comparing a pre-stored drawing pattern table with the drawing pattern, comprises: displaying a candidate list corresponding a first sub-pattern of the drawing pattern by recognizing the first sub-pattern of the drawing pattern, and displaying a corresponding menu and a sub-menu of the menu by selecting the drawing pattern of the candidate list.

In some exemplary embodiments, the step of, executing the sub menu by selecting the sub menu, comprises: confirming a stop position of a drawing after the drawing is followed by the drawing pattern inputted; and executing the sub-menu disposed in the stop position.

In some exemplary embodiments, the step of executing the sub menu by selecting the sub menu, comprises: detecting a direction of a drawing if the drawing is followed by the drawing pattern inputted; executing the sub-menu disposed on a position corresponding to the direction.

In some exemplary embodiments, the step of displaying a menu corresponding to the drawing pattern and the sub menu on the touch screen by comparing a pre-stored drawing pattern table and the drawing pattern, comprises displaying the sub-menu in a circle type at center of the menu.

In some exemplary embodiments, the method for executing a menu may further comprise: inputting a set-up drawing pattern on the touch screen; appointing a corresponding menu for the set-up drawing pattern; and storing the set-up drawing pattern in the drawing pattern table.

In some exemplary embodiments, the step of displaying a menu corresponding to the drawing pattern and the sub menu on the touch screen by comparing a pre-stored drawing pattern table and the drawing pattern, comprises displaying the menu corresponding to the drawing pattern and the sub-menu of the menu if a predetermined time lapses after inputting of the drawing pattern is completed.

Moreover, another object of the present disclosure is to provide a mobile terminal, comprising: a touch screen configured to input a drawing pattern, a memory configured to store a drawing pattern table; and a controller configured to display a menu corresponding to the drawing pattern and the sub menu of the menu by comparing the drawing pattern with the drawing pattern table if the drawing pattern is inputted through the touch screen, and to execute the sub-menu if the sub-menu is selected.

In some exemplary embodiments, the drawing pattern includes a first sub-pattern, and the controller is configured to controllably display a candidate menu list corresponding to the first sub-pattern by recognizing the sub-pattern of the drawing pattern, and to display a corresponding menu and a sub-menu of the menu on the touch screen by selecting the drawing pattern of the candidate list.

In some exemplary embodiments, wherein, the controller is configured to confirm a stop position of a drawing after the drawing is followed by the drawing pattern inputted, and to execute the sub-menu disposed in the stop position.

In some exemplary embodiments, the controller is configured to detect a direction of a drawing if the drawing is followed by the drawing pattern inputted, and to execute the sub-menu disposed on a position corresponding to the direction.

In some exemplary embodiments, the controller is configured to control the touch screen so that the sub menu can be arranged in a circle type in the center of the menu In some exemplary embodiments, the controller is configured to confirm a screen status displayed on the touch screen and to determine whether the input of the drawing pattern is recognized based on the screen status.

In some exemplary embodiments, the controller is configured to recognize the input of the drawing pattern when the screen status is any one of an idle screen, a main screen, or a drawing pattern input screen.

In some exemplary embodiments, the controller is configured to store a set-up drawing pattern in the drawing pattern table, when the set-up drawing pattern is inputted on the touch screen and a menu corresponding to the set-up drawing pattern is appointed.

Moreover, another object of the present disclosure is to provide a mobile terminal, comprising: a touch screen configured to display a menu for connecting a call signal and to input a drawing pattern corresponding to a phone number; a wireless communication unit configured to connect the call signal; and a controller configured to connect the call signal to a phone number through the wireless communication unit when a drawing pattern corresponding to the phone number is inputted in a state of holding the menu.

In some exemplary embodiments, the drawing pattern includes a first sub pattern, and the controller is configured to display a phone number candidate list including the first sub pattern if the first sub pattern is inputted.

In some exemplary embodiments, the controller is configured to display the candidate list in the circle type, and to connect the call signal on the phone number corresponding to a direction by recognizing the direction of the drawing extending from the inputted drawing pattern.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
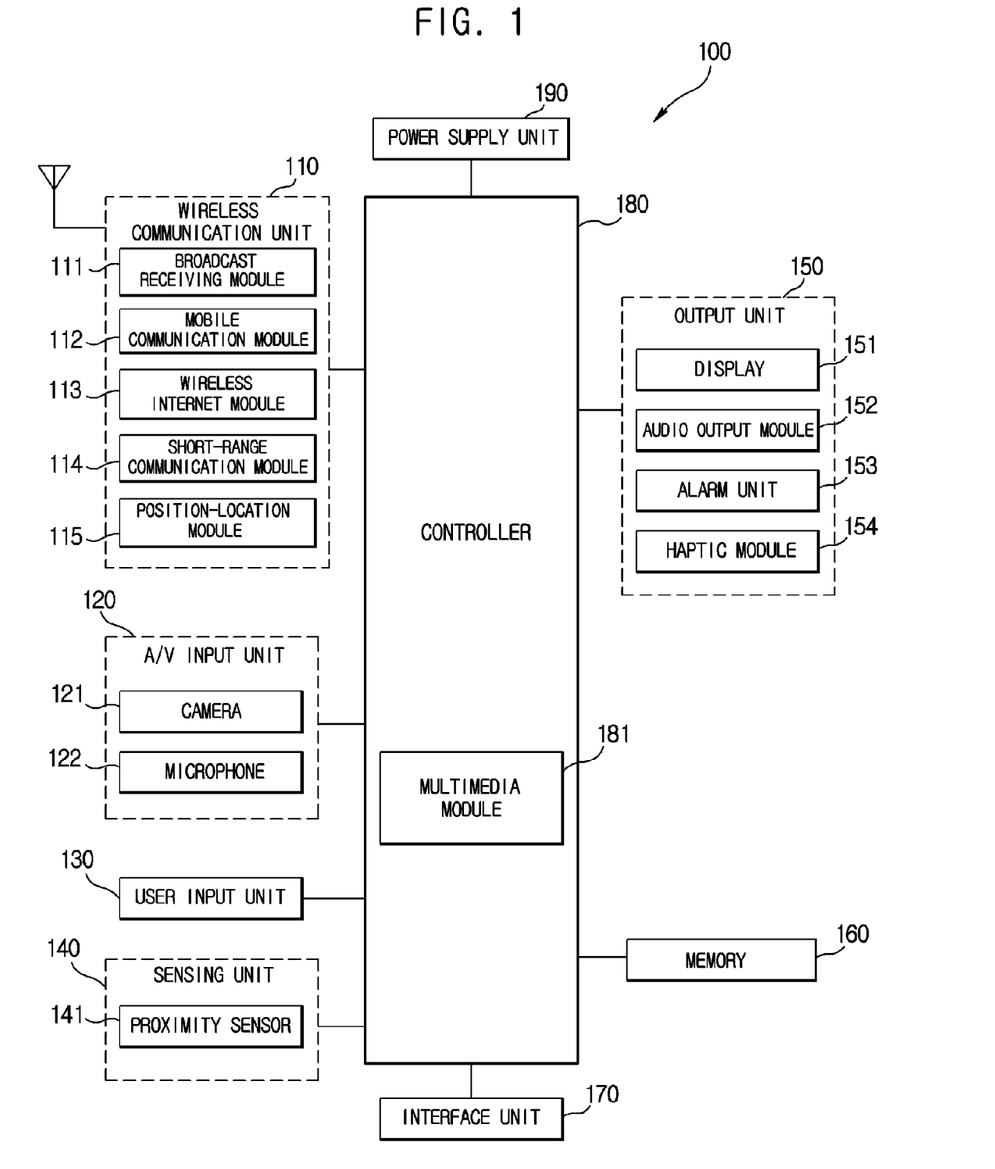
FIG. 1 is a block diagram of a mobile terminal in accordance with an example embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
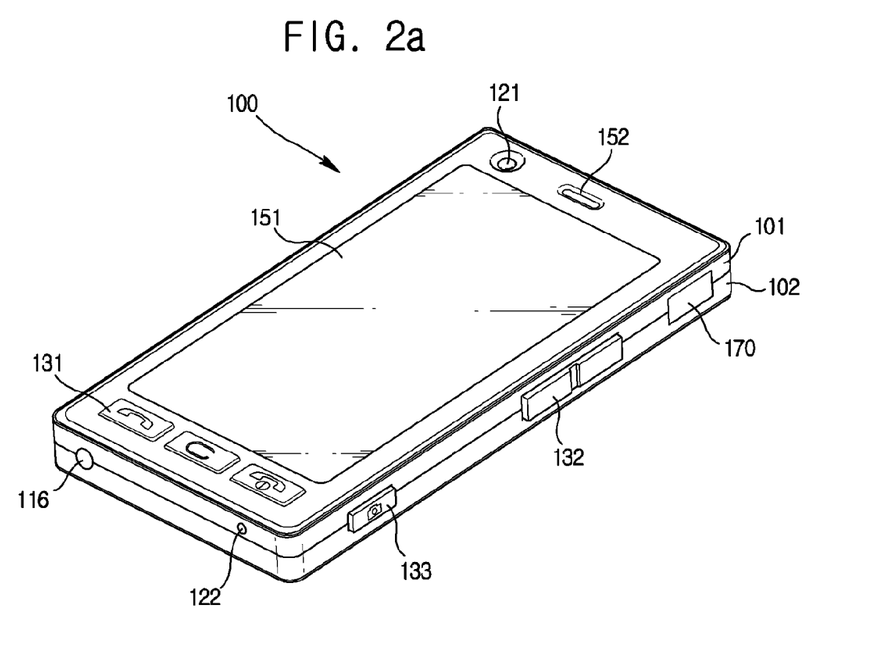
FIG. 2A is a front-view of a mobile terminal according to an example embodiment.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
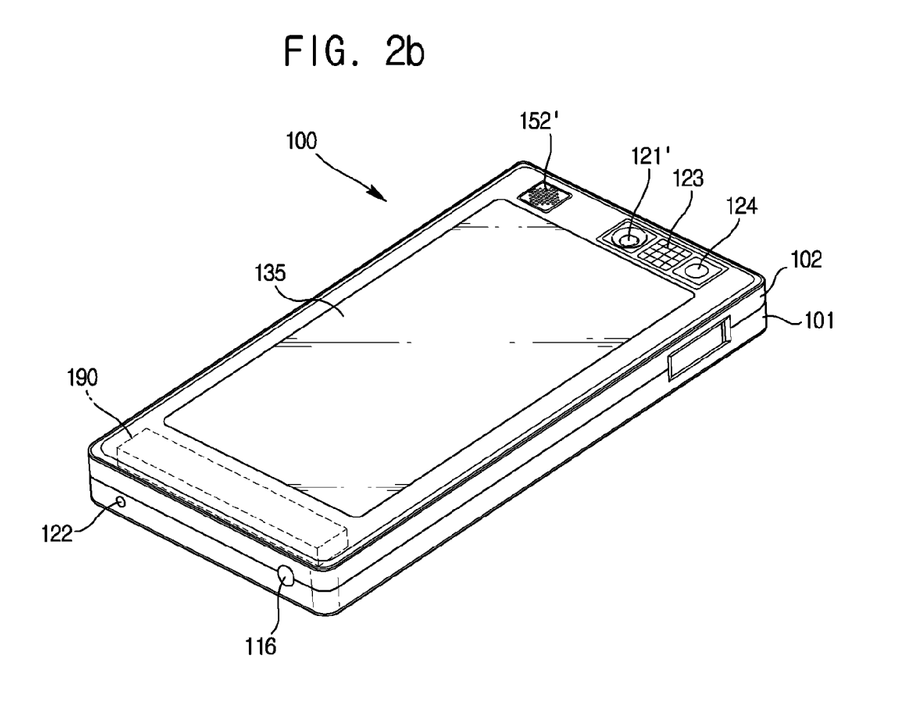
FIG. 2B is a perspective diagram of a backside of the mobile terminal shown in FIG. 2A.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
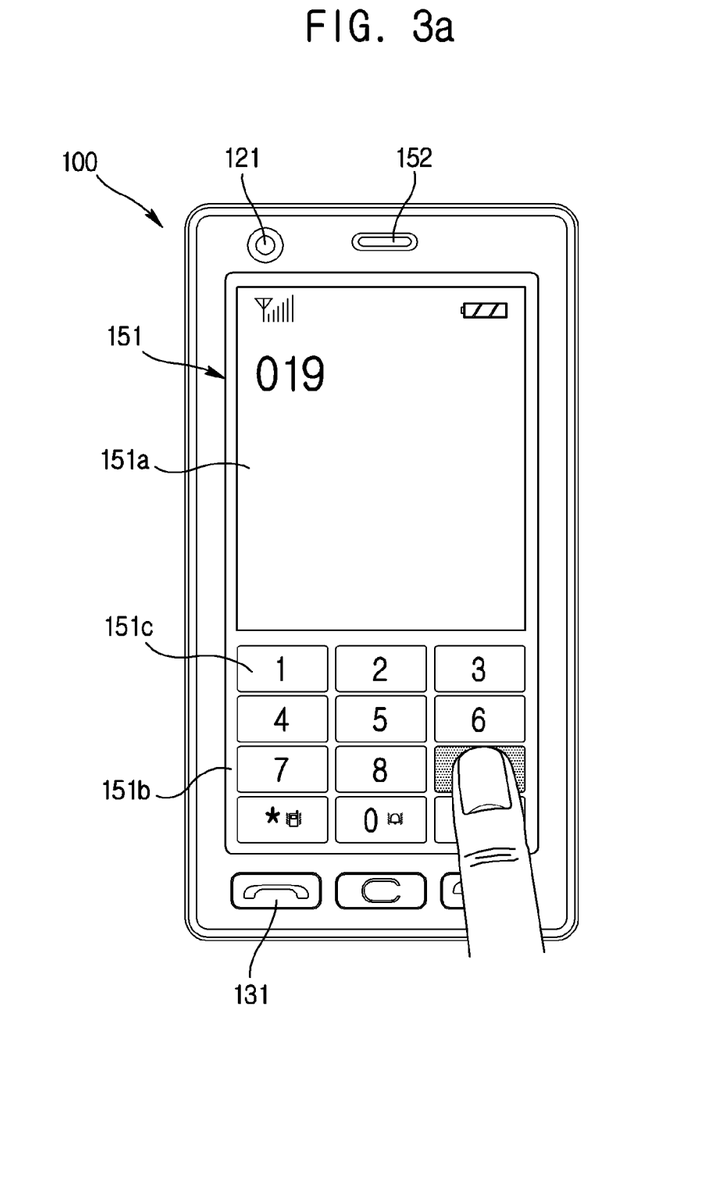
FIGS. 3A and 3B are front-view diagrams of a mobile terminal according to an example embodiment.
Figure 3B:
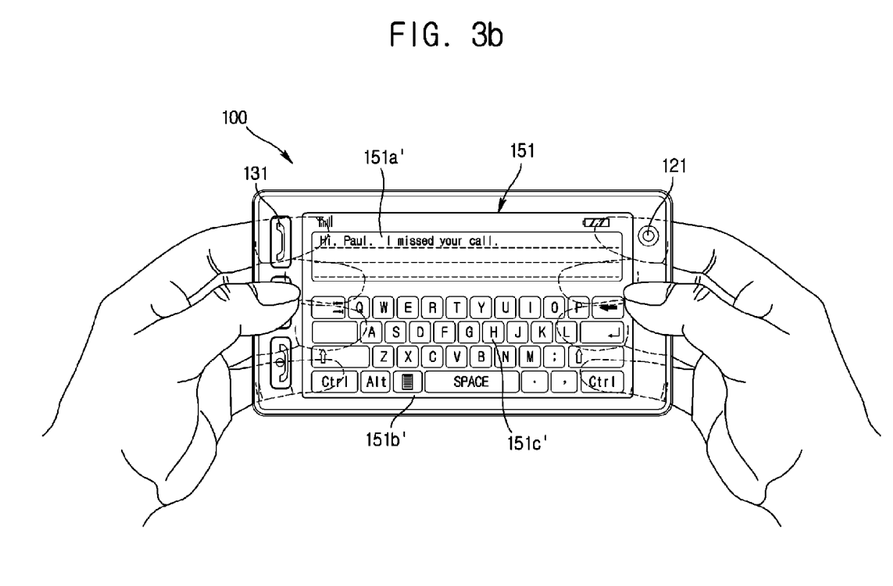

FIGS. 3A and 3B are front-view diagrams of a mobile terminal according to an example embodiment. Other embodiments, configurations and arrangements are also within the scope of the present disclosure.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body.

The display 151 may be operable through an entire area or may be divided into a plurality of regions. The plurality of the regions may be configured interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body is vertically arranged (i.e., in a portrait manner). FIG. 3B shows that the terminal body is horizontally arranged (i.e., in a landscape manner). The display 151 may change an output picture according to the arranged direction of the terminal body.

FIG. 3B also shows that a text input mode is activated in the mobile terminal 100. FIG. 3B shows that the touch screen of the display 151 may include an output window 151a and an input window 151b. The output window 151a and the input window 151b may be displayed on the display 151. A plurality of soft keys 151c representing characters, symbols and/or digits may be arranged in the input window 151b. The soft keys 151c may be arranged in a QWERTY key formation.

If the soft keys 151c are touched using the touchpad 135, the characters, symbols and/or digits corresponding to the touched soft keys may be outputted to the output window 151a. Touch input via the touchpad 135 may be advantageous in that the soft keys 151c may be prevented from being blocked by a finger in case of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the mobile terminal 100 can be executed. The simultaneous touch may correspond to a case that the terminal body is held by a user using a thumb and a first finger (clamping). The function may include activation or deactivation for the display 151 or the touchpad 135.

On the other hand, it is assumed that the display unit 151 is a touch screen.

In the following description, the method for executing a menu in the mobile terminal according to the present disclosure will be explained, referring to FIG. 4 and FIG. 5.

Figure 4:
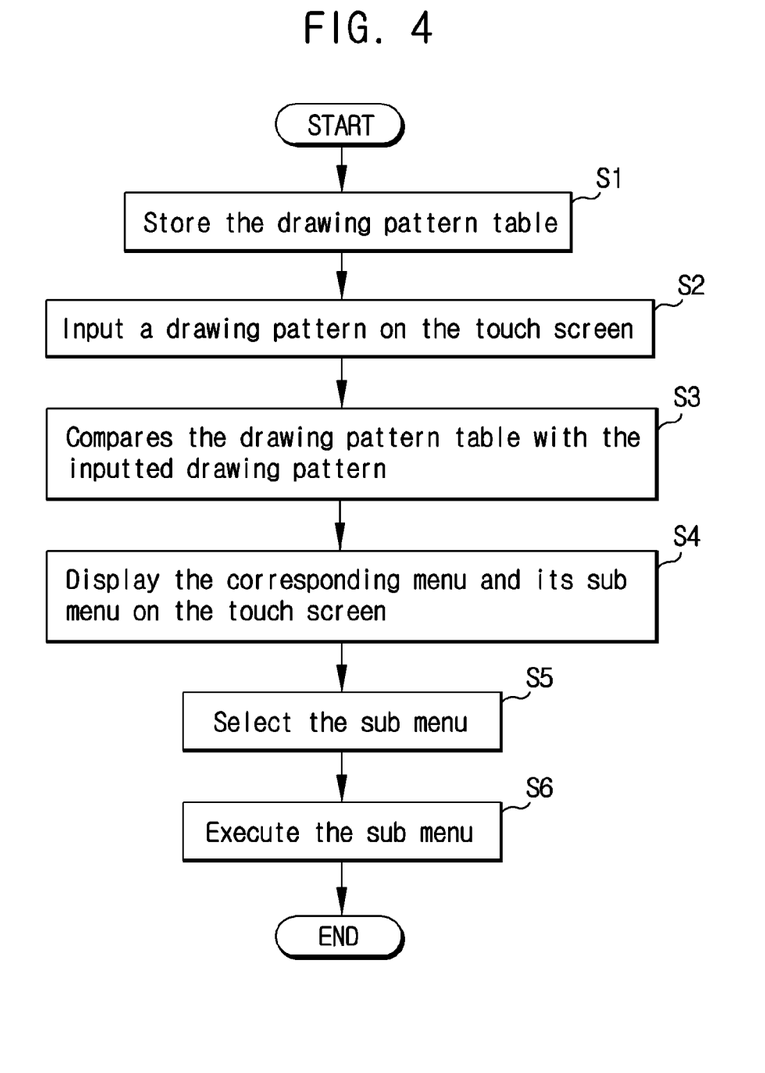
FIG. 4 is a flow chart for explaining a first embodiment in the method for executing a menu in the mobile terminal, according to the present disclosure.
Figure 5:
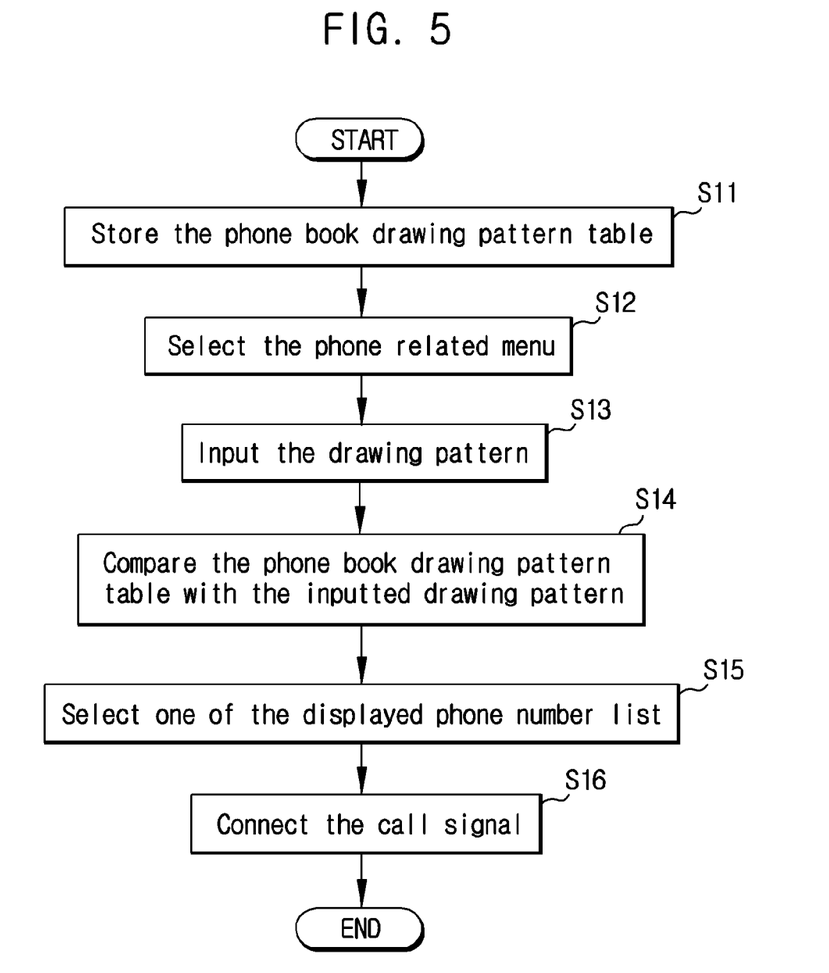
FIG. 5 is a flow chart for explaining a second embodiment in the method for executing a menu in the mobile terminal, according to the present disclosure.

FIG. 4 is a flow chart for explaining a first embodiment in the method for executing a menu in the mobile terminal, according to the present disclosure, and FIG. 5 is a flow chart for explaining a second embodiment in the method for executing a menu in the mobile terminal, according to the present disclosure.

First Embodiment

Figure 6:
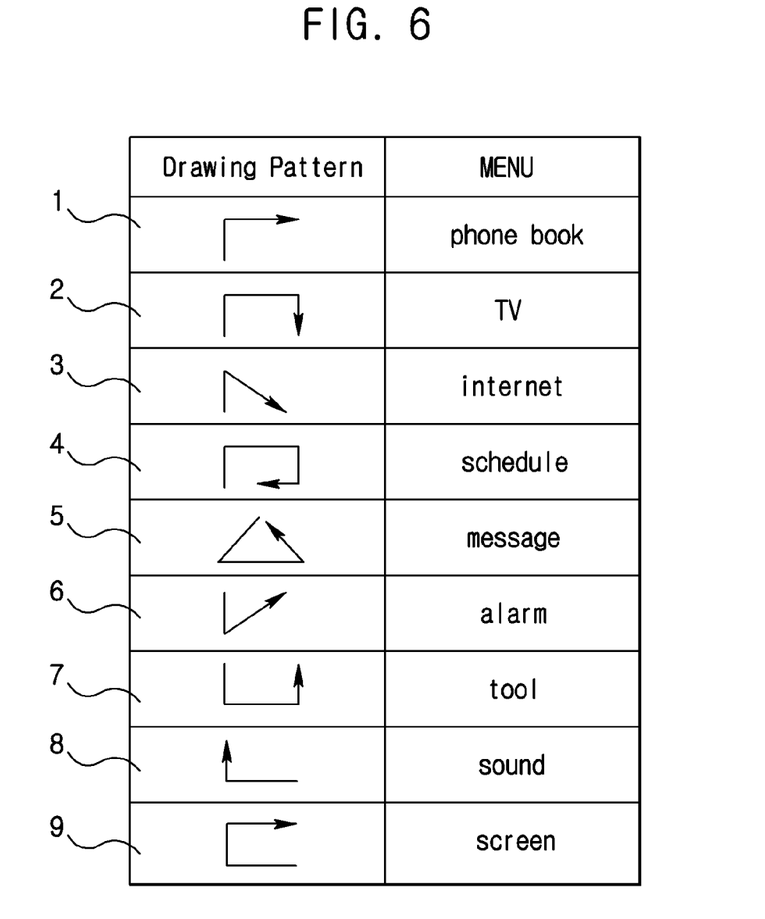
FIG. 6 illustrates an example of the table used in the method for executing the menu in the mobile terminal, according to the present disclosure.

As shown in FIG. 4, a drawing pattern table is stored in the memory 160 of the mobile terminal 100 (S1). The drawing pattern table means a table made of a drawing pattern and a corresponding menu. The drawing pattern is supposed to be received on the touch screen by the user. The example of the drawing pattern table is shown in FIG. 6. In a state that the drawing pattern table is stored in the memory, a user inputs a drawing pattern on the touch screen 151 (S2). Then, the controller 180 compares the drawing pattern table with the inputted drawing pattern by the user and confirms a corresponding menu (S3). At this time, if a first sub pattern of the drawing pattern is inputted, a drawing pattern icon having a pattern as the first sub pattern may be displayed on the touch screen 151. The detailed description on this matter will be explained with reference to FIG. 7 and FIG. 8. On the other hand, if the controller confirms the corresponding menu, the controller displays the corresponding menu and its sub menu on the touch screen (S4). At this time, the sub menu may be displayed in the form of a list, or in the form of a circle. The detailed description on this matter will be explained with reference to FIG. 8 and FIG. 9. Then, the user may select the sub menu displayed on the touch screen. At this time, the selection of the sub menu may be made by placing a pointing device on a position for a while, where the sub menu is located, or by detaching the pointing device from the touch screen where the sub menu is located. Alternatively, in the state that the sub menu is displayed, the direction gesture is used in selecting the sub menu. If the sub menu is selected by the aforementioned manner, the sub menu is executed (S6).

The input of the drawing pattern may be made on an idle screen or a drawing pattern input screen. Namely, if the user turns on the mobile terminal, the idle screen or the main screen may be displayed on the display unit 151. In this state, if the user inputs a drawing pattern on the display unit 151, the controller executes the aforementioned manner to execute a menu corresponding to the inputted drawing pattern. Or, if the drawing pattern input menu is entered by the user's manipulation of the input unit 130, the drawing pattern input screen is displayed on the display unit 151. In the drawing pattern input screen, the user may input the drawing pattern.

Therefore, if the touch screen (display unit) is locked, which means that the touch screen is inactivated not to recognize the touch input of the pointing device, the user should unlock the touch screen, and then the user may input the drawing pattern.

Generally, in case that the mobile terminal is in a ready state, the touch screen is locked. Therefore, while a pattern is drawn on the touch screen without user's intention, the mobile terminal is not operated.

According to the first embodiment of the present disclosure, the user may execute a menu that he wants with a simple single gesture on the touch screen.

Second Embodiment

FIG. 5 is a flow chart for explaining a second embodiment in the method for executing a menu in the mobile terminal, according to the present disclosure.

As shown in FIG. 5, a phone book drawing pattern table is stored in the memory 160 of the mobile terminal 100 (S11). The phone book drawing patter table means a table made of a drawing pattern and a corresponding phone number. The example of the phone book drawing pattern table is not illustrated on the figures. In a state that the phone book drawing pattern table is stored in the memory 160, the user selects (holds) a phone related menu (S12). Here, the phone related menu may include a text message menu, a voice call menu, and a video call menu. In the state that the phone related menu is selected, the user inputs the drawing pattern (the phone drawing pattern) on the touch screen 151 (S13). Then, the controller 180 compares the phone book drawing pattern table with the inputted drawing pattern by the user and confirms a corresponding phone number (S14). At this time, if a first sub pattern of the phone drawing pattern is inputted, a phone number list having the same sub pattern as the first sub pattern may be displayed on the touch screen 151. The user may select one of the displayed phone number list (S15). At this time, the selection of the phone number may be made by placing a pointing device on a position for a while, where the phone number is located, or by detaching the pointing device from the touch screen where the phone number is located. Alternatively, in the state that the phone number is displayed, the direction gesture is used in selecting the phone number. If the phone number is selected by the aforementioned manner, the phone related menu is executed (S16). Namely, the controller 180 activates the wireless communication unit 110 to execute a voice call or a video call, or to transmit a text message.

According to the second embodiment of the present disclosure, the user may execute a voice call, video call or a text message by doing a simple single gesture on the touch screen.

FIG. 6 illustrates an example of the table used in the method for executing the menu in the mobile terminal, according to the present disclosure.

A left column of the table in FIG. 6 shows drawing patterns, and a right column of the table in FIG. 6 shows menus corresponding to each drawing pattern. For example, if a drawing pattern similar to that of the reference number 1 is inputted through the touch screen, controller 180 executes a phone book menu to display the phone book menu and its sub menu on the touch screen. If a drawing pattern similar to that of the reference number 2 is inputted through the touch screen, controller 180 executes a TV menu to display the TV menu and its sub menu on the touch screen. If a drawing pattern similar to that of the reference number 3 is inputted through the touch screen, controller 180 executes a internet menu to display the internet menu and its sub menu on the touch screen. If a drawing pattern similar to that of the reference number 4 is inputted through the touch screen, controller 180 executes a schedule menu to display the schedule menu and its sub menu on the touch screen. If a drawing pattern similar to that of the reference number 5 is inputted through the touch screen, controller 180 executes a message menu to display the message menu and its sub menu on the touch screen. If a drawing pattern similar to that of the reference number 6 is inputted through the touch screen, controller 180 executes an alarm menu to display the alarm menu and its sub menu on the touch screen. If a drawing pattern similar to that of the reference number 7 is inputted through the touch screen, controller 180 executes a tool menu to display the tool menu and its sub menu on the touch screen. If a drawing pattern similar to that of the reference number 8 is inputted through the touch screen, controller 180 executes a sound menu to display the sound menu and its sub menu on the touch screen. if a drawing pattern similar to that of the reference number 9 is inputted through the touch screen, controller 180 executes a screen menu to display the screen menu and its sub menu on the touch screen. The various drawing patterns and their corresponding menus may be changed or reset by the user.

It should be understood that the table aforementioned would be just one example and that the various modifications may be available.

In the following description, the implementations where the method for executing the menu in the mobile terminal is applied will be explained by referring to FIG. 7 to FIG. 9.

Figure 7:
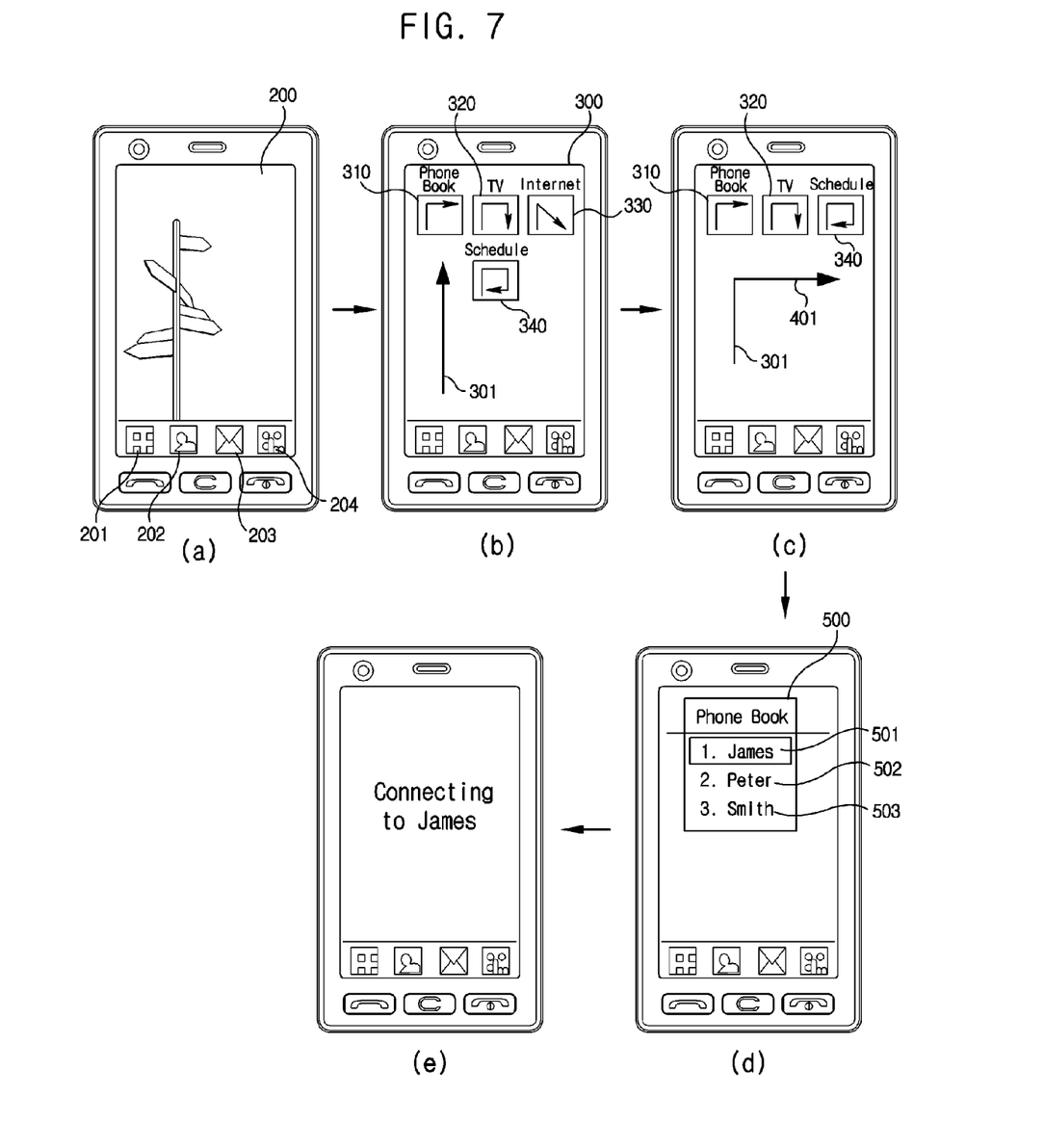
FIG. 7 illustrates a first implementation where the method for executing the menu in the mobile terminal is applied.
Figure 8:
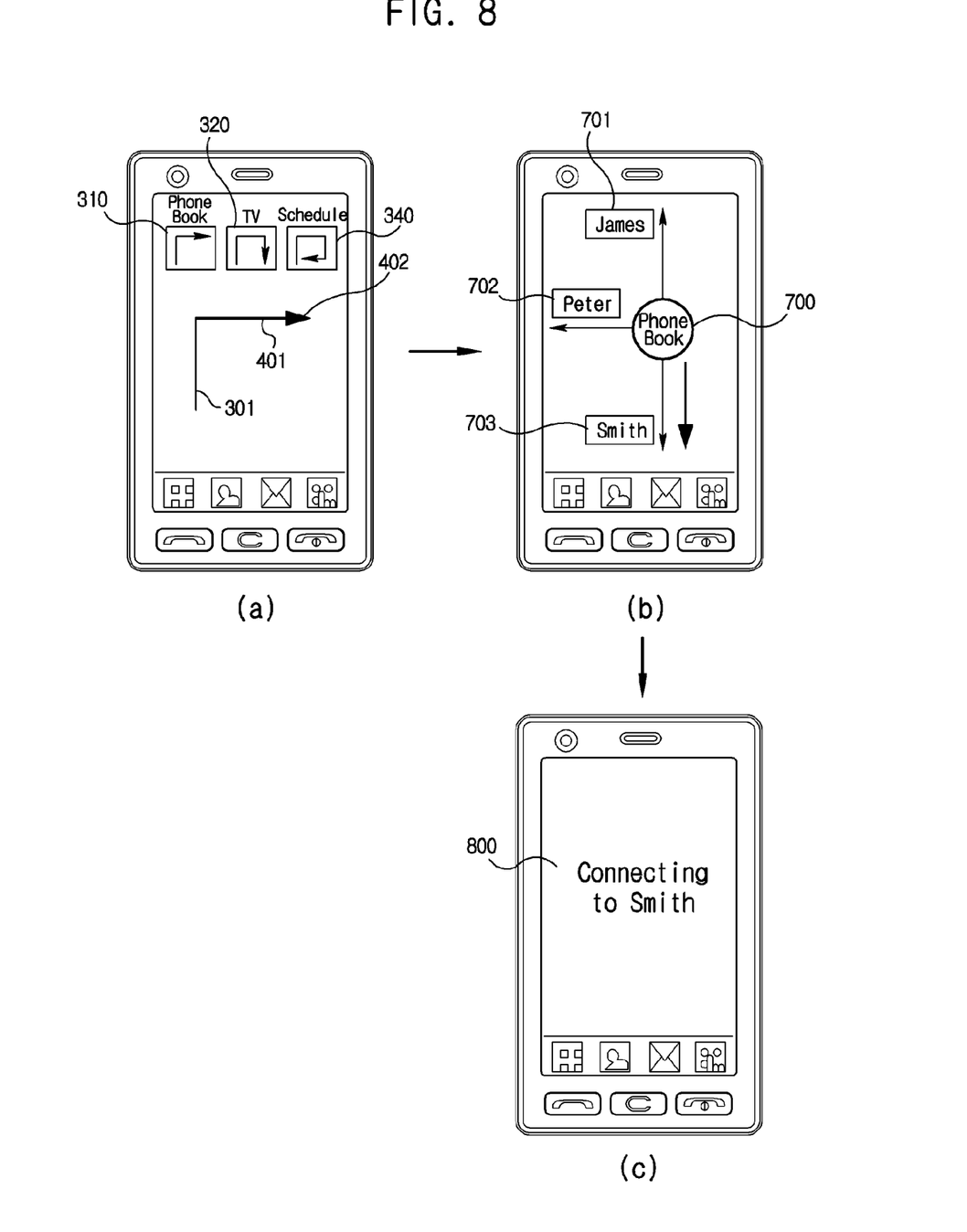
FIG. 8 illustrates a second implementation where the method for executing the menu in the mobile terminal is applied.
Figure 9:
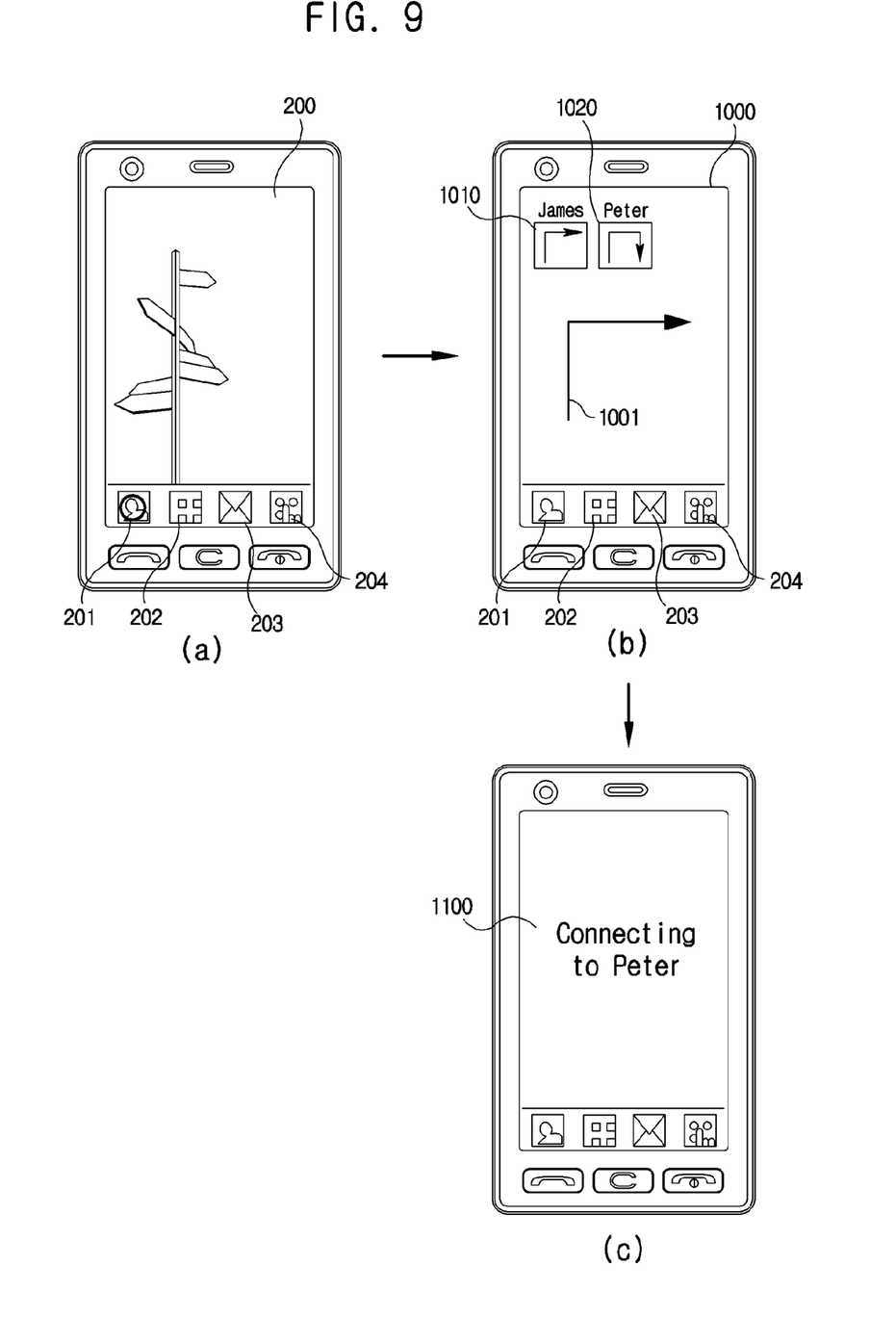
FIG. 9 illustrates a third implementation where the method for executing the menu in the mobile terminal is applied.

FIG. 7 illustrates a first implementation applied with the method for executing the menu in the mobile terminal, FIG. 8 illustrates a second implementation applied with the method for executing the menu in the mobile terminal, and FIG. 9 illustrates a third implementation where the method for executing the menu in the mobile terminal.

[First Implementation]

FIG. 7 illustrates a first implementation where the method for executing the menu in the mobile terminal is applied. FIG. 7A illustrates an idle screen 200. The automatic launcher menu icons 201-204 are disposed on a lower part of the idle screen 200. In this state, if a drawing pattern having a first sub pattern (↑) 301 is inputted through the touch screen, as shown in FIG. 7B, the menu icons having the first sub pattern (↑) 301 (here, a phone book icon 310, a TV icon 320, an internet icon 330, and a schedule icon 340) are displayed on the touch screen. The menu icons, as shown in FIG. 7, include the name of the menu and the stored drawing pattern. Again, if a second sub pattern (→) 401 is sequentially inputted into the first sub pattern 301, as shown in FIG. 7C, the icons having both the first sub pattern 301 and the second sub pattern 401 are classified and displayed on the touch screen (here, the phone book icon 310, the TV icon 320, and the schedule icon 340). At this time, the user may select any one of the icons 310, 320, 340 by touching the icon. Since the phone book icon is an icon having only the first sub pattern and the second sub pattern, if a predetermined time lapses after inputting the second sub pattern, the phone book icon is selected and the phone book menu 500 and its sub menus 501-503 may be displayed on the touch screen (See FIG. 7D). If the user extends the drawing and detaches the touch on a position where a sub icon is located, the sub icon is selected to be executed. Accordingly, the controller 180 transmits the call signal to the phone number included in the first sub icon 501 (See FIG. 7E).

According to the first implementation of the present disclosure, the user may execute the menu that he wants by a single gesture.

[Second Implementation]

FIG. 8 illustrates a second implementation where the method for executing the menu in the mobile terminal is applied.

FIG. 8A illustrates a screen where the drawing pattern having the first sub pattern and the second sub pattern is inputted. As shown in FIG. 8, the icons having the first sub pattern and the second sub pattern are classified and displayed. (here, the phone book icon 310, the TV icon 320, and the schedule icon 330). In this state, if a predetermined time lapses, the phone book icon 310 is selected. Then, as shown in FIG. 8B, the phone book menu 700 is displayed on the touch screen. Alternatively, the user may select the phone book icon 310 may be selected by touching the icon within a predetermined time. The sub menus 701-703 of the phone book menu are circularly disposed.

Here, if the user makes a flicking gesture to the sub icon that he wants among the sub icons 701-703, the controller detects a direction of the flicking gesture to select the sub icon corresponding to the direction of the flicking gesture. In FIG.

8B, the lower direction flicking signal is generated. The third sub icon 703 is disposed in the lower direction. Then, the third sub icon 703 is selected. Accordingly, the controller 180 transmits the call signal to the phone number included in the third sub icon 703 (See FIG. 8C).

According to the second implementation of the present disclosure, the user may execute the menu that he wants by the single gesture.

[Third Implementation]

FIG. 9 illustrates a third implementation where the method for executing the menu in the mobile terminal is applied.

FIG. 9A illustrates an idle screen 900. The automatic launcher menu icons 201-204 are disposed on a lower part of the idle screen 900. The user selects and holds one icon of the automatic launcher menu icons. Here, the first automatic launcher menu icon (phone call icon) 201 is selected. In this state, the user draws a first sub pattern (↑) and a second sub pattern (→). Then, a candidate phone number list 1010-1020 having the drawing pattern 1001 including the first sub pattern and the second sub pattern is displayed on the display unit 151 (See FIG. 9B). In this state, if the one icon of the candidate phone number list is selected (here, the second candidate phone 1020), the first automatic launcher menu is executed on the selected phone number. In this implementation, since the first automatic launcher menu is a phone call icon, the controller 180 attempts to connect a call signal to the second candidate phone number (See FIG. 9C).

According to the present implementation, the phone call is exemplified. However, the present disclosure does not limit on this implementation. For example, The transmission of the text message or the multimedia message may be applied.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for executing a menu in a mobile terminal, the method comprising:
    receiving a drawing pattern on a touch screen of the mobile terminal;
    comparing the received drawing pattern to a pre-stored drawing pattern table;
    displaying at least one menu and sub-menu corresponding to the received drawing pattern on the touch screen according to the comparison;
    receiving an input to select one of the at least one displayed sub-menu; and
    executing the selected sub-menu,
    wherein displaying the at least one menu and sub-menu comprises:
        recognizing a first sub-pattern of the received drawing pattern;
        displaying a candidate list comprising at least one drawing pattern corresponding to the recognized first sub-pattern;
        receiving an input to select a drawing pattern from the displayed candidate list; and
        displaying a menu and sub-menu corresponding to the selected drawing pattern.

2. The method of claim 1, wherein executing the selected sub-menu comprises:
    determining a stop position of the received drawing pattern; and
    executing a sub-menu located at the determined stop position.

3. The method of claim 1, wherein executing the selected sub-menu comprises:
    determining a direction of a drawing of the received drawing pattern; and
    executing a sub-menu located at a position corresponding to the determined direction.

4. The method of claim 3, wherein displaying the at least one menu and sub-menu corresponding to the received drawing pattern comprises circularly displaying a plurality of sub-menus about a center of the at least one menu.

5. The method of claim 1, further comprising:
    receiving a preset drawing pattern on the touch screen;
    designating a corresponding menu for the preset drawing pattern; and
    storing the preset drawing pattern in the drawing pattern table.

6. The method of claim 1, wherein displaying the at least one menu and sub-menu corresponding to the received drawing pattern comprises determining that a predetermined period of time lapses after receiving the drawing pattern.

7. The method of claim 1, further comprising:
    determining a screen status displayed on the touch screen; and
    recognizing the received drawing pattern according to the determined screen status.

8. The method of claim 7, wherein the received drawing pattern is recognized when the screen status is an idle screen, a main screen, or a drawing pattern input screen.

9. A mobile terminal comprising:
    a touch screen configured to receive a drawing pattern;
    a memory configured to store a drawing pattern table; and
    a controller configured to
    compare the received drawing pattern to the stored drawing pattern table;
    recognize a first sub-pattern of the received drawing pattern;

display a candidate list comprising at least one drawing pattern corresponding to the recognized first sub-pattern of the received drawing pattern;

process an input to select a drawing pattern from the displayed candidate list;

display at least one menu and sub-menu corresponding to the selected drawing pattern;

process an input to select one of the at least one displayed sub-menu; and execute the selected sub-menu.

10. The mobile terminal of claim 9, wherein the controller is further configured to:

determine a stop position of the received drawing pattern; and execute a sub-menu located at the determined stop position.

11. The mobile terminal of claim 9, wherein, the controller is further configured to:

determine a direction of a drawing of the received drawing pattern; and execute a sub-menu located at a position corresponding to the determined direction.

12. The mobile terminal of claim 11, wherein the controller is further configured to display the at least one menu and sub-menu corresponding to the received drawing pattern by controlling the touch screen to circularly display a plurality of sub-menus about a center of the at least one menu.

13. The mobile terminal of claim 9, wherein the controller is further configured to:

receive a preset drawing pattern on the touch screen;

designate a corresponding menu for the preset drawing pattern; and store the preset drawing pattern in the drawing pattern table.

14. The mobile terminal of claim 9, wherein the controller is further configured to display the at least one menu and sub-menu corresponding to the received drawing pattern by determining that a predetermined period of time lapses after receiving the drawing pattern.

15. The mobile terminal of claim 9, wherein, the controller is further configured to:

determine a screen status displayed on the touch screen; and recognize the received drawing pattern according to the determined screen status.

16. The mobile terminal of claim 15, wherein the controller is further configured to recognize the received drawing pattern when the screen status is an idle screen, a main screen, or a drawing pattern input screen.

\* \* \* \* \*